(No Model.) 2 Sheets—Sheet 1.
E. E. WHIPPLE.
HARROW.
No. 600,658. Patented Mar. 15, 1898.
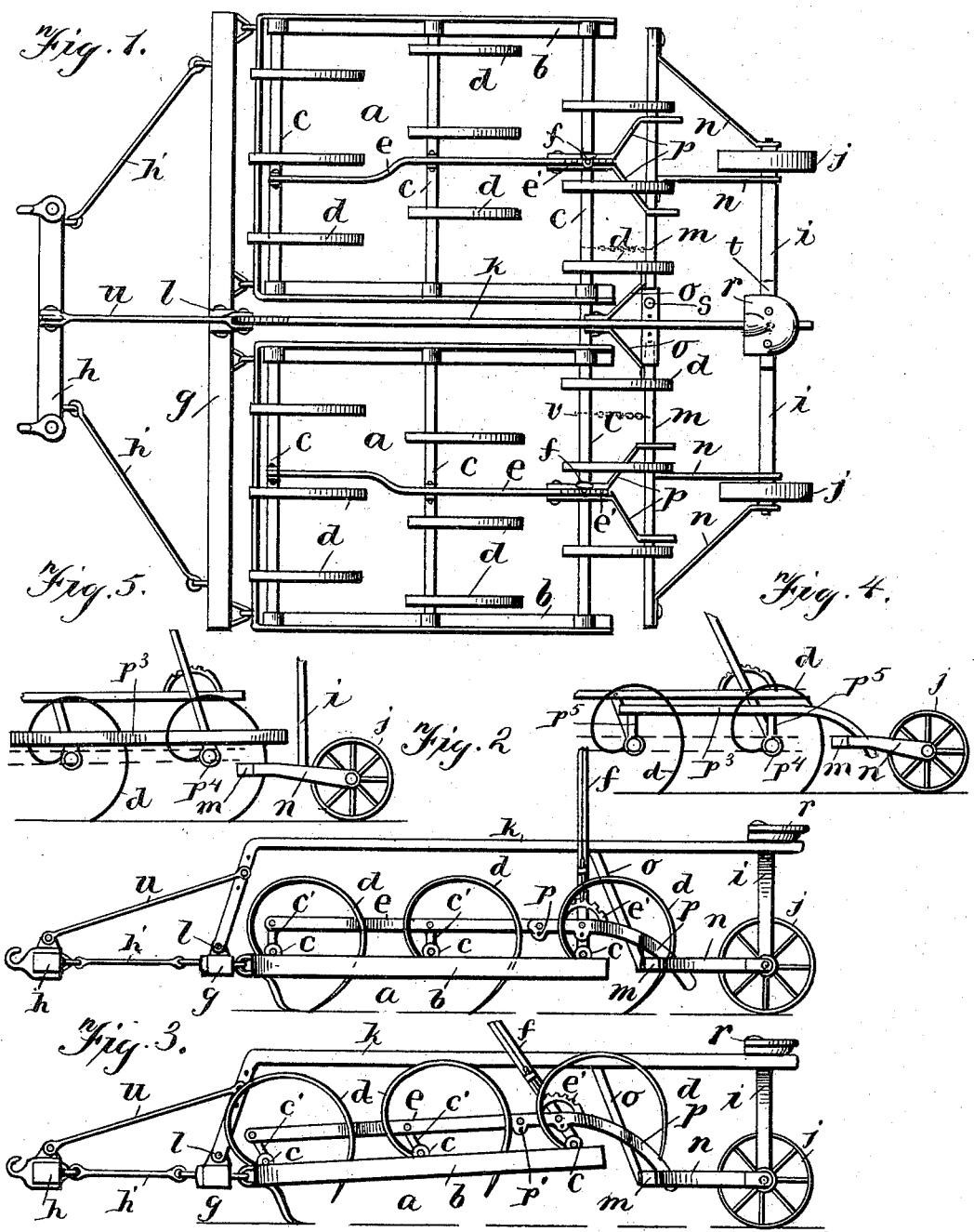
Witnesses
Geo. E. Frech.
Chas. R. Wright Jr.
Inventor
E. E. Whipple.
per Hubert Peak
Attorney

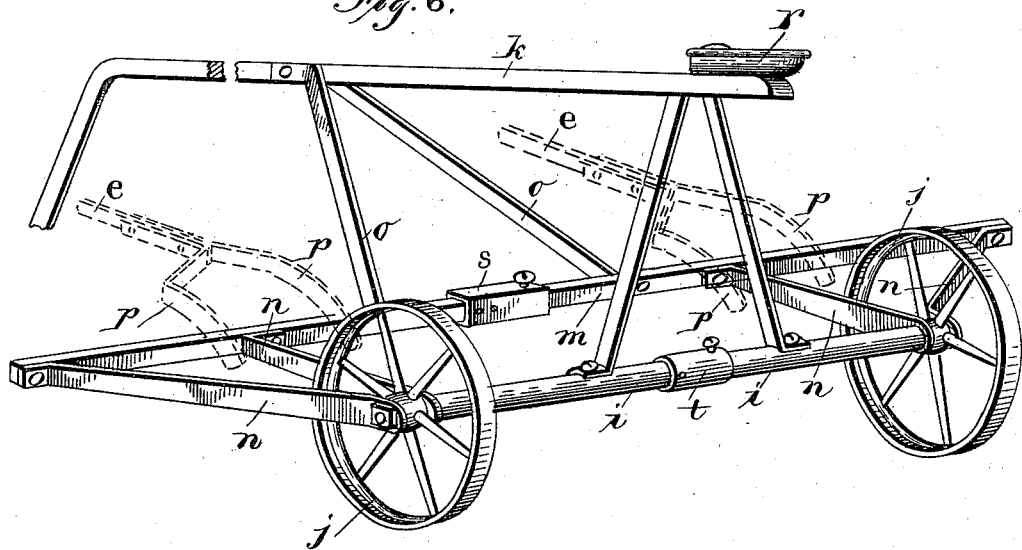

UNITED STATES PATENT OFFICE.

EFFINGER E. WHIPPLE, OF COOPERSTOWN, NEW YORK.

HARROW.

SPECIFICATION forming part of Letters Patent No. 600,658, dated March 15, 1898.

Application filed November 16, 1896. Serial No. 612,316. (No model.)

*To all whom it may concern:*

Be it known that I, EFFINGER E. WHIPPLE, a citizen of the United States, residing at Cooperstown, in the county of Otsego and State of New York, have invented certain new and useful Improvements in Harrows; and I do hereby declare the following to be a full, clear, and exact description of the invention, such as will enable others skilled in the art to which it appertains to make and use the same.

This invention relates to certain improvements in riding or wheeled supporting attachments for harrows and like implements.

I claim, among other features, to be the first to have conceived and applied the combination of substantially an independent wheeled or riding attachment with a lever spring-tooth harrow supported and carried by the wheeled attachment in a given horizontal plane above the ground when the teeth are in or out of operative engagement with the soil and at the same time leave the harrow free to float or follow the inequalities of the ground and to move above the horizontal plane of the support on or connected to the wheeled attachment, which support always limits the downward movement of the harrow, and the lever mechanism attached to the harrow-frame for raising or turning the teeth out of contact with the soil to facilitate transportation of the harrow on the wheeled attachment.

Among other features, by the arrangement and location of the support the teeth may be set to any required depth on the frame, and when so set the harrow-frame is carried on the horizontal plane above the ground by a support located on or attached to the wheel attachment in such manner as to engage some portion of the frame and carry the same, and the support should be so arranged that the frame is free to oscillate or move above the plane of the support to adapt the harrow to inequalities of soil and to leave its working mechanism in position to do the work of a float-harrow without carrying the weight of the riding attachment. By this arrangement a large amount of clearance is given beneath the harrow-frame to permit trash to work out of the harrow without lodging on or in the frame.

The invention consists in certain novel features of construction and in combinations and in arrangements of parts, as more fully and particularly set forth and described hereinafter.

Referring to the accompanying drawings, Figure 1 is a plan view of a two-section harrow having a riding or wheeled supporting attachment, illustrating a construction of device which can be constructed with my present invention, the teeth being shown adjusted to operative position. Fig. 2 is a side elevation of the harrow with the teeth in operative or working adjustment. Fig. 3 is a side elevation showing the teeth raised from operative position and the rear end of the toothed harrow upheld by the wheeled support or attachment. Figs. 4 and 5 are details of modifications. Fig. 6 is a detail perspective view of the wheeled supporting attachment for harrows and the like, dotted lines showing the parts extending rearwardly from the harrow and arranged to rest on said support in upholding the rear end of the harrow.

In the drawings, $a\ a$ are the sections of a two-section harrow, although I wish it understood that I do not limit my invention to employment in connection with any particular construction of harrow formed of any particular number of sections from one section or more nor to any peculiar construction of harrow frame, teeth, or draft appliances from the harrow-sections *per se.*

$b$ indicates the frame of each harrow-section, having the rockable tooth-bars $c$, mounted to turn in suitable bearings carried by the frame and provided with the curved spring harrow-teeth $d$, arranged to be thrown down into operative digging position or raised from the ground and out of operative position by turning the tooth-bars.

The tooth-bars of each harrow-section are coupled together and provided with adjusting and locking means of any suitable or desirable construction whereby the tooth-bars of a section can be simultaneously turned or rocked to raise or lower the teeth and can then be locked in the desired adjustment. A means herein shown for this purpose comprises a coupling and adjusting bar $e$, extending over the tooth-bars of a section and pivotally joined to the arms $c'$, rigid with and extending up from the tooth-bars. One of the tooth-bars, usually the rear tooth-bar, has an upwardly-extending hand-lever $f$ rigid therewith and pivotally joined to the rear portion of the coupling-bar, which has a rack $e'$ rigid therewith beside the lever. The lever is provided with a suitable pawl-and-ratchet mechanism, as a spring-held pawl to engage the teeth of said rack and controlled by a spring-held hand-clip at the handle of the lever. By this well-known arrangement a forward movement of the handle or upper end of the lever will throw the coupling-bar forward and thereby rock all of the tooth-bars and raise the teeth from operative position and from the ground. The pawl engaging the rack on the coupling-bar will lock all of the tooth-bars in this adjustment. A rearward movement of the lever after releasing the pawl from the rack will rock the tooth-bars to throw the ends of the teeth down into operative position, in which position the parts are locked by engagement of the pawl and rack.

$g$ is an evener-bar arranged in front of the harrow-sections and to which the front ends of all the harrow-sections are loosely coupled.

$h$ is a whiffletree arranged in front of the central portion of the evener-bar and to which the draft is suitably attached. This whiffletree is suitably and loosely coupled to the evener-bar by any suitable means, such as the loose rod connections $h'$. However, I do not limit my invention to the employment of such a whiffletree, as any suitable means can be employed in advance of the evener-bar for coupling together the connections from the evener-bar and the additional draft devices, hereinafter mentioned, so that the draft-animals can be attached thereto.

A suitable wheeled support is provided in rear of the harrow, usually comprising an upwardly-arched axle or connecting-frame $i$, provided with suitable supporting-wheels $j$ at its ends or suitably arranged at other points. A draft-tongue or attaching-bar $k$ is at its rear end secured to said axle or connecting-frame $i$, usually at or about the center thereof, and from thence extends forwardly over the harrow, with its front end extended downwardly and loosely coupled to the evener-bar at or about the center of the length thereof, at $l$. This draft-bar $k$ is arranged a sufficient distance above the harrow to clear the teeth and so as not to interfere with the working or adjustments of the harrow-teeth or any of its parts, and in the present instance is shown extending above the center of the harrow or, where two sections are employed, above the space between the two sections; but my invention is not limited to any specific location of such connection with respect to the harrow.

The supporting-frame or axle $i$ of the riding or wheeled attachment carries a bar $m$, arranged directly in rear of the harrow and all the sections thereof and horizontally beneath the tooth-adjusting bars of the sections. This bar $m$ is supported in the desired position a short distance above the surface of the ground by any suitable number of braces $n$, extending forwardly from the connecting-frame or axle $i$ and rigidly secured to the bar $m$ and said axle or frame, and by braces $o$, depending from and rigidly secured to the connecting draft-bar $k$ and at their lower ends secured to the said bar $m$, so that the bar $m$ forms a rigid part of the frame of the wheeled supporting attachment and is directly supported and upheld by the wheels and by the connecting draft-bar from the draft devices of the harrow. The support in this instance which carries the harrow in an elevated position above the ground engages and carries the harrow by the forked ends of the connecting-bar on each section.

$p$ are forked extensions rigidly secured to the adjusting-bars $e$ of the harrow-sections and extending rearwardly and downwardly therefrom over the support $m$ of the wheeled attachment and so arranged and combined in relation to the support $m$ that when the tooth-bars are adjusted with the teeth in their normal operative position said forked ends will extend downwardly beyond and behind the support $m$ and permit the teeth to freely work and the harrow-sections to yield and swing above the horizontal plane of the support in following the surface of the ground independently of the wheeled attachment, but so that when the hand-levers are forced forward to raise the teeth from the ground and from operative position the adjusting-bars $e$ in moving forward will carry said forked ends $p$ against the support $m$ and cause said forked ends to ride up on the support $m$ as the teeth are raised, and thereby raise the harrow-sections from the ground, as shown in Fig. 3 of the drawings. Hence when the draft is attached at the front of the harrow the harrow will be entirely raised from the ground and supported at the front by the draft and small wheels or shoes, such as $b'$, and at the rear by the support through the medium of the forked ends $p$, resting on the support $m$ of the frame of the wheeled attachment. As the teeth go into the ground the frame settles down, but is not permitted to go below the point where bars $p$ strike the bar $m$, leaving the harrow-sections free to perform their proper functions free of the wheeled attachment.

The adjusting-bars $e$, provided with their forked ends $p$, are made vertically adjustable by the series of bolt-holes $p'$ to raise or lower bars $p$. By this arrangement the harrow-frame may be carried in different horizontal planes above the ground.

I do not wish to limit my invention to any specific means for supporting the harrow on the wheeled attachment, for any portion of or part connected with the harrow can drop or move down onto the support to uphold the harrow on the wheeled support as the teeth are elevated, and the harrow-frame consequently settles down. For instance, in Fig. 5 a portion of a rocking-tooth-bar float-harrow is shown having a suitably-connected wheeled support, wherein a bar $p^3$ extends across several tooth-bars and projects at the rear over a part of the wheeled support. This bar can be loosely coupled to the tooth-bars by sleeves $p^4$ thereon, if so desired, or it can be pivotally joined to the standards $p^5$, rigid with the tooth-bars, as shown in Fig. 4. As the teeth are thrown from the ground the harrow settles down as the teeth move up until a portion of the harrow engages the support on the wheeled attachment and thereby arrests its downward movement. The wheeled support and portion of the harrow to rest thereon are so relatively arranged and combined that they will engage at such points as to arrest the downward movement of the harrow before it engages the ground, so as to support it the proper distance from the ground for the purposes of use and transportation, while a suitable shoe or other support at the front carries the front end of the harrow elevated above the ground, giving a large clearance under the frame. If a rearwardly-projecting bar is provided to engage and support the rear end of the harrow on the support, it can be straight, as shown in Fig. 5, or can be bent or curved, as shown in Fig. 4 and previous figures.

If desired, the wheeled support can be so constructed as to be expansible should it be desirable to increase or decrease the length thereof. This can be rendered possible by making the axle $i$ and the support $m$ in sections with overlapping ends or adjustable couplings and series of bolt-holes, so that the sections can be shifted and the clamping bolts or means changed from hole to hole to increase or diminish the length of the wheeled attachment.

The reference-letter $s$ refers to the point of adjustment in support $m$, and the letter $t$ to the point of adjustment in the axle $i$ beneath or adjacent to the seat thereon. However, my invention is not limited to the employment of these adjustments of the support $m$ and axle $i$ nor to any specific manner of adjustment, if such be desired.

Also, if so desired, means can be provided for vertically adjusting the support $m$—as, for instance, by increasing or diminishing the length of the braces $o\ o$ from draft-bar $k$. A draft-coupling $u$ is attached to an elevated point of the front portion of the connecting draft-bar $k$ of the wheeled attachment, and at a point above the evener-bar, and from thence extends forwardly and downwardly to the whiffletree or other connecting means for the attachment of the draft to various points of the evener-bar. Various bolt-holes can be provided in the front portion of the connecting-draft $k$, if desired, so that the point of securing the connection $u$ to said bar can be vertically adjusted. Material advantages are attained by employing this connection from the upper part of the bar $k$ down to the draft-attaching devices, as the draft is thus so distributed as to hold down the front end of the harrow, which otherwise might have a tendency to raise with the bar $k$, coupled thereto, and the weight of the attachment and rider in the rear. However, my invention is not limited to coupling the tongue from a riding attachment to an evener-bar, as evener-bars are not always so arranged, and the tongue can be coupled at the front of the harrow in any manner with the downwardly-inclined connection to the draft.

In the employment of my invention no extra levers are required, as the levers already on the harrow can be operated from the seat to adjust the teeth and by the same movement either raise or drop the harrow; nor does the harrow carry the weight of the attachment, but the harrow is free to swing and move over the ground independent of the attachment above the plane of the support, and the teeth can be raised to clear the teeth or for transporting the harrow without raising the attachment.

If desired, in heavy ground the weight of the attachment can be thrown onto the harrow to hold the harrow to the ground—as, for instance, by a hook or other connection $v$ (shown in dotted lines in Fig. 2) or in any other suitable manner.

It should also be noted that the invention is not limited to any specific or peculiar location of the support, or to a specific construction of the support, or whether or not each section has a separate support, or whether a single support is arranged to coöperate with all the sections of a harrow.

It is evident that various changes might be made in the forms, constructions, and arrangements of the parts described without departing from the spirit and scope of my invention. Hence I do not limit my invention to the construction shown, but consider myself entitled to all such changes and modifications as fall within the spirit and scope of my invention.

Having thus fully described my invention, what I claim as new, and desire to secure by Letters Patent of the United States, is—

1. A harrow having turnable tooth-bars, lever-operated adjusting-bars connected to the tooth-bars and extending rearwardly, inclined downwardly and deflected laterally, in combination with a wheeled riding attachment in rear of the harrow coupled to the draft attachments of the harrow and having a support under and disconnected from said adjusting-bar extensions which rest thereon, substantially as described.

2. A rocking tooth-bar harrow, in combination with a wheeled attachment coupled with the harrow and having a support extending beneath a portion of or part connected with the harrow to limit the downward movement thereof and thereby assist in supporting and upholding the harrow from the ground when the teeth are in or out of the soil, substantially as described.

3. A harrow having teeth and adjusting means to raise and lower them, in combination with a wheeled attachment loosely coupled to the harrow and disconnected from its rear end and extending beneath a portion of the harrow at its rear end thereby upholds and carries the rear end of the harrow, substantially as described.

4. A rocking tooth-bar harrow having a rearwardly-extending part, and the front depending supports, in combination with a rear wheeled attachment provided with a tongue coupled with the harrow at its front and with a support beneath said rearwardly-extending part of the harrow to limit the downward movement of said part, substantially as described.

5. A harrow, in combination with a wheeled support loosely coupled with the front of the harrow, and a connection whereby the weight of the support can be thrown onto the rear end of the harrow to hold it down, substantially as described.

6. A sectional lever-harrow provided with a rearwardly-extending member on each section, in combination with a wheeled attachment forming a support, whereby the harrow is carried in a plane above the ground and so arranged that the harrow is free to move above the plane of the support, for the purpose stated.

7. A support provided with wheels, in combination with a harrow having extensions to the rear onto the support and supporting the harrow at a given height, and a center draft connection for the support and wheels, for the purpose stated.

8. A wheeled attachment provided with a support, in combination with a lever curved-spring-tooth harrow supported above the horizontal surface of the ground upon the support, substantially as set forth.

9. A wheeled attachment provided with a support, in combination with a lever curved-spring-tooth harrow supported above the horizontal surface of the ground upon the support, and provided with the front depending supports, substantially as described.

10. In a lever-harrow having two or more independent sections, an evener-bar to which the sections are coupled, wheeled attachments carrying supports, the combination therewith of downwardly-projecting supports located at or adjacent the outer angles of the front portions of the frames, substantially as described.

11. In a lever-harrow having two sections; a wheel-support substantially as described, in combination with downwardly-projecting frame-supports located at or adjacent to the front angles of the frame, substantially as set forth.

12. A wheeled attachment provided with a support, in combination with a lever curved-spring-tooth harrow carried on the support above the horizontal surface of the ground, and a depending shoe substantially as set forth.

13. A lever spring-tooth harrow, in combination with a wheeled attachment provided with a draft-tongue and with vertically-adjustable supporting means extending into engagement with the harrow, substantially as set forth.

14. A harrow, in combination with an axle at the after part and connected with the draft of the harrow, and having a support extending forwardly beneath a part of the harrow to limit the downward movement thereof, substantially as described.

15. A harrow, in combination with a wheeled support at the after part of and connected with the harrow in advance of its rear portion, said support extending forwardly beneath and disconnected from a part of the harrow, substantially as described.

16. The axle with wheels mounted thereon with draft attachment and the support in front of the axle and carried by it, in combination with a harrow having turnable toothbars and a rearwardly-extending portion in engagement with the axle-support, whereby when the working points of the teeth are elevated the harrow-frame is supported.

17. The axle with wheels mounted thereon and with draft attachment, and the support in front of the axle and carried by it, in combination with a harrow having turnable toothbars provided with curved spring-teeth, the harrow-frame being carried in an elevated position by the support in front of the axle when the working points of the teeth are elevated by the lever mechanism.

18. A wheeled attachment provided with a connecting-support to a harrow-frame, in combination with a lever curved-spring-tooth harrow carried by the support on the wheeled attachment, whereby the harrow-frame is carried in an elevated horizontal plane when the teeth are in or out of operative contact with the soil, and whereby the harrow is free to move above the horizontal plane of the support.

19. A wheeled attachment provided with a draft connection to the front of the harrow and with a support for engaging the harrow-frame, in combination with a lever curved-spring-tooth harrow supported in an elevated horizontal plane above the soil, and carried on the support, and provided with depending shoes, substantially as set forth.

20. A lever curved-spring-tooth harrow, and a wheeled attachment provided with a support for engaging and carrying the harrow-frame and having a draft-tongue, in combination with mechanism, substantially as set forth, for adjusting the draft-tongue with the draft of the harrow, for the purposes stated.

21. A lever spring-tooth harrow, a wheeled attachment provided with a centrally-disposed draft connection, in combination with supporting means connected to the wheeled attachment and the harrow, whereby the harrow-frame can be carried in an elevated plane above the ground whether the teeth are in or out of operative engagement with the soil and by means of which the harrow-frame is free to move above the plane of the engagement of the harrow-frame with the support.

22. A lever spring-tooth harrow, a wheeled attachment provided with a draft connection, in combination with supporting means connected to the wheeled attachment and to a member of the harrow-frame, and vertically-adjusting means whereby the plane of the contact-points between the support and the frame member can be vertically adjusted for carrying the frame in different horizontal planes above the soil, substantially as described.

23. A lever curved-spring-tooth harrow in combination with a wheeled attachment provided with draft attachment, and with an engaging support for engaging the harrow-frame and carrying the same in an elevated position above the surface of the ground, whereby the frame can be carried in the same plane when the teeth are in or out of engagement with the soil and leave the frame free to move above the plane of the support, for the purposes stated.

24. A wheeled attachment provided with draft attachment, a driver's seat, and supporting means for engaging and carrying the harrow-frame above the soil, in combination with a lever curved-spring-tooth harrow supported and carried above the surface of the ground by the supporting means, substantially as described.

25. A wheeled attachment provided with draft connections and supporting means, in combination with an adjusting-tooth-bar harrow, the connection-bars of which engage the support carried by the wheeled attachment, and the lever mechanism for operating the teeth, whereby the horizontal plane of the harrow-frame can be raised or lowered by the operation of the lever mechanism.

26. A harrow having a lever-operated connecting-bar, in combination with a wheeled attachment having a support upholding the harrow through the medium of said connecting-bar.

27. A curved-spring-tooth harrow provided with a series of rocking tooth-bars connected and operated by a connecting-bar, and lever-operating mechanism, in combination with a riding attachment with connected draft attachment, and supporting means connecting the riding attachment and the lever-operated connecting-bar, whereby the frame is supported in different horizontal planes, by the lever-operated mechanism.

28. A lever-harrow in combination with depending harrow-frame supports, and an independent harrow-frame-supporting wheeled attachment whereby the harrow is carried in an elevated plane above the ground for the purposes stated.

In testimony whereof I affix my signature in presence of two witnesses.

EFFINGER E. WHIPPLE.

Witnesses:
HANNAH M. WHIPPLE,
FENNIMORE O. WHIPPLE.